Oct. 15, 1957   E. S. BRADFORD   2,809,427
WEEDING TOOL
Filed Oct. 19, 1955

INVENTOR.
ERNEST S. BRADFORD
BY
Luther W. Hawley
ATTORNEY

United States Patent Office 2,809,427
Patented Oct. 15, 1957

2,809,427
WEEDING TOOL

Ernest S. Bradford, New Rochelle, N. Y.

Application October 19, 1955, Serial No. 541,485

2 Claims. (Cl. 30—356)

This invention relates to a weeding tool.

Ordinary knives with straight blades cannot be used efficiently to cut and remove weeds.

This invention has for its object to provide a weeding tool having a blade so shaped that it will have a cutting and scooping action and can be used effectively and rapidly to cut and remove weeds.

Further objects of the invention will appear from the following specification taken in connection with the drawings which form a part of this application, and in which.

In the form of the invention shown, the tool comprises a handle 10 and a knife blade 11 secured thereto and projecting therefrom.

The blade 11 has a flat portion 12 and an arcuate or curved portion 13 merging with the flat portion and extending therebeyond.

Figure 1:
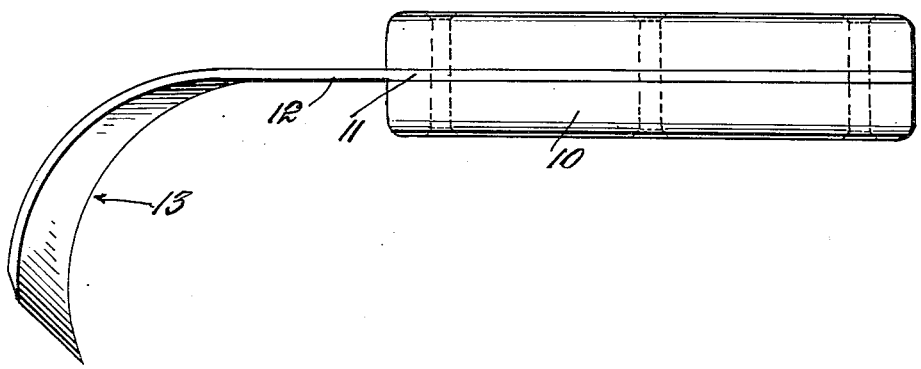
Fig. 1 is an elevational side view showing one edge of the knife blade.
Figure 2:
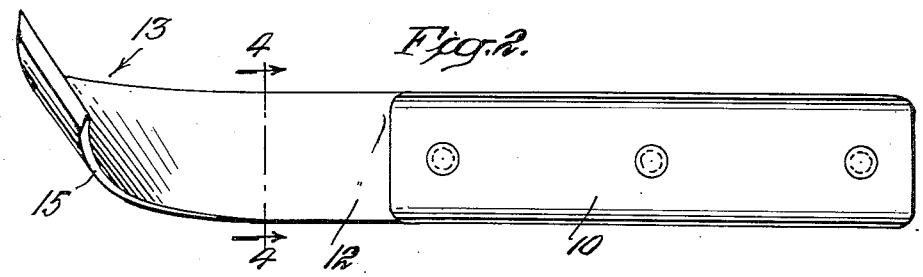
Fig. 2 is a plan view of the tool.
Figures 3, 4:
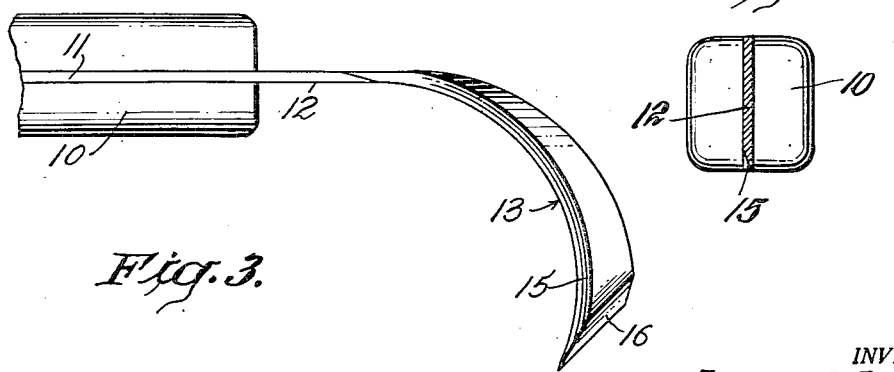
Fig. 3 is an elevational view similar to Fig. 1 but looking at the knife from the opposite direction.
Fig. 4 is a sectional elevation taken substantially on line 4—4 of Fig. 2, looking in the direction of the arrows.

It will be noted that the curved portion 13 not only curves away from the flat portion but swings or curves upwardly. The bottom edge, viewing Figs. 2 and 3, is beveled, as shown at 15, and forms a cutting edge. The end of the blade is also beveled to form a cutting edge, as shown at 16. In use, the end 16 and corner at the junction of the edges 15 and 16 is first inserted in the soil and pushed downwardly and the blade is twisted by a twist of the wrist and cuts the weed and throws it out of the ground.

The blade, because of its unusual shape, has a scooping and cutting action and readily enters the soil and cuts the weeds.

Although one particular embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. A weeding tool comprising a handle and a blade extending beyond the handle and secured thereto, said blade having a flat portion and a portion merging into the flat portion and twisted axially and curved away from the plane of the flat portion until the outer portion of the blade is substantially at a right angle to the plane of the portion near the handle, said blade being sharpened on its lower edge and on its outer end to form cutting edges, the cutting edge of the curved portion being curved upwardly relative to the cutting edge portion of the flat portion, assuming that the tool is positioned with the cutting edge down, the outer end of the blade having its cutting edge disposed at an angle to the remaining cutting edge on the lower edge of the blade.

2. A weeding tool comprising a handle and a blade extending beyond the handle and secured thereto, said blade having a flat portion and a portion merging into the flat portion and twisted axially and curved away from the plane of the flat portion until the outer portion of the blade is substantially at a right angle to the plane of the portion near the handle and having a cutting edge along the lower edge, the cutting edge portion along the curved portion of the blade having a curvature of shorter radius than the other edge of the blade, the outer end of the blade having a cutting edge disposed at an angle to the remaining or lower cutting edge.

References Cited in the file of this patent

UNITED STATES PATENTS

| | | |
|---|---|---|
| D. 30,291 | Merrill | Feb. 28, 1899 |
| 695,353 | Turner | Mar. 11, 1902 |
| 783,010 | Beavin | Feb. 21, 1905 |
| 2,370,440 | Beavin | Feb. 27, 1945 |
| 2,513,663 | McDaniel | July 4, 1950 |